United States Patent [19]

Wagner

[11] Patent Number: 5,553,558

[45] Date of Patent: * Sep. 10, 1996

[54] EQUIPMENT AND PROCESS FOR SURFACE TREATMENT OF HAZARDOUS SOLIDS AND SLURRIES WITH MOLTEN ALLOY

[76] Inventor: Anthony S. Wagner, 13709 Hwy. 71 West, Bee Caves, Tex. 78738-3117

[*] Notice: The term of this patent shall not extend beyond the expiration date of Pat. No. 5,359,947.

[21] Appl. No.: 221,521

[22] Filed: Apr. 1, 1994

Related U.S. Application Data

[63] Continuation-in-part of Ser. No. 103,122, Aug. 9, 1993, Pat. No. 5,359,947, which is a continuation-in-part of Ser. No. 982,450, Nov. 27, 1992, Pat. No. 5,271,341, which is a continuation-in-part of Ser. No. 699,756, May 14, 1991, Pat. No. 5,171,546, which is a continuation-in-part of Ser. No. 524,278, May 16, 1990, Pat. No. 5,000,101.

[51] Int. Cl.$^6$ .................................................. F23G 7/04
[52] U.S. Cl. ........................ 110/346; 110/235; 110/214; 588/201
[58] Field of Search ................................ 110/346, 235, 110/243, 255; 588/201

[56] References Cited

U.S. PATENT DOCUMENTS

| | | | |
|---|---|---|---|
| 4,338,869 | 7/1982 | Hoskinson | 110/346 |
| 4,374,499 | 2/1983 | Fassell | 112/243 |
| 4,711,600 | 12/1987 | Yates | 404/95 |
| 4,722,286 | 2/1988 | Portner | 110/243 |
| 4,848,250 | 7/1989 | Wunderley | 110/235 |
| 5,000,101 | 3/1991 | Wagner | 110/346 |
| 5,078,822 | 1/1992 | Hodges et al. | 156/294 |
| 5,271,341 | 12/1993 | Wagner | 110/346 |
| 5,301,620 | 4/1994 | Nagel et al. | 110/346 |
| 5,359,947 | 11/1994 | Wagner | 110/346 |

Primary Examiner—Henry A. Bennett
Assistant Examiner—William C. Doerrler
Attorney, Agent, or Firm—Joseph F. Long

[57] ABSTRACT

A process and equipment for treating a solid or semi-solid waste by moving the waste across a surface of a reactive metal alloy in an oxygen deficient atmosphere and separating for recycling the resultant dissolved metals while feeding the resultant off gas containing hydrogen, nitrogen, and carbon to a scrubber unit; venting gases to the air and recycling scrubber water through a filter to recover carbon for recycling.

12 Claims, 3 Drawing Sheets

EQUIPMENT AND PROCESS FOR SURFACE TREATMENT OF HAZARDOUS SOLIDS AND SLURRIES WITH MOLTEN ALLOY

BACKGROUND OF THE INVENTION

This a C.I.P. of Ser. No. 08/103,122, U.S. Pat. No. 5,359,947 filed 8/9/93, entitled "Equipment and Process for Waste Pyrolysis and Off Gas Oxidative Treatment" which is a C.I.P. of Ser. No. 07/982,450, now U.S. Pat. No. 5,271,341, filed 11/27/92, and entitled "Equipment and Process for Medical Waste Disintegration and Reclamation" which is, in turn, a C.I.P. of Ser. No. 07/699,756, U.S. Pat. No. 5,171, 546, filed 5/14/91, entitled "Waste Treatment and Metal Reactant alloy Composition" which is, in turn, a C.I.P. of Ser. No. 07/524,278, U.S. Pat. No. 5,000,101 filed 5/16/90, entitled: "a Hazardous Waste Reclamation Process." The closest prior art is Ser. No.'s. 08/103,122; 07/982,450; 07/699,756 and 07/524,278, all by Anthony S. Wagner, filed and entitled as outlined above.

The present invention differs significantly from the closest prior art. In this invention a pyrolysis unit is designed for a controlled feed of hazardous solids to a screw conveyor with conveyor flights partially submerged in molten alloy. Conveyor speed may be adjusted for specific feed rates and specific hazardous solids being treated. Use of the screw conveyor properly enclosed provides a tortuous off gas path to assure complete contact of pathogenic material with surfaces above 250° centigrade. At the same time movement of the solids through the conveyor as they float on the molten alloy surface results in sufficient solid motion to give excellent solid—alloy contact.

In one embodiment a ceramic blanket is used between the outer edge of the conveyor flights and the shell. The shell is contoured to fit over the conveyor to improve contact with hot surfaces of gases that are initially released.

The alloy may be held molten either by heating with fossil fuel or by electrical induction heating. For larger volume treatment fossil fuel heating is preferred.

With surface treatment for a short time interval of a refinery waste commonly called K Waste we've shown that all water is removed; volatile organics are a decomposed to their elements and metals such as chromium, nickel etc are removed to meet "best available technology" specifications.

The pyrolysis is carried out in an essentially oxygen free atmosphere with carbon dioxide being the preferred unit purge gas.

The off gas from the unit is scrubbed to remove any solid particulates and carbon that is eluted and any volatilized material salts. The alloy composition may be adjusted to hold volatile chlorides, bromides etc. in the bath.

SUMMARY OF THE INVENTION

The invention covers equipment and process for continuous controlled surface treatment by contact with a molten alloy of a solid or semi solid such as a solid commonly called K - Waste in refineries.

The alloy composition may be varied as follows:
50–100% aluminum
0–20% calcium
0–50% iron
0–50% zinc
0–50% copper The aluminum may be the lowest cost commercial grade that would be expected to have all the following impurities:
iron - 5.0% max.
copper - 5.0% max.
silicon - 2.5% max.
zinc - 5.5% max.
magnesium - 2.5% max.
manganese - 2.5% max.
chromium - 0.5% max.
nickel - 2.5% max.
tin - 0.5% max.
titanium - 0.3 max.
other metals - 0.5% max.

Further experience has shown that scrap aluminum alone, which would have even higher impurity levels than the commercial grade aluminum, functions very well in most applications. In actual operation there appears to be no diminution of a activity with increasing content of various metals in the aluminum alloy used for treatment. Alloy discharge appears to be necessary only if increasing metals concentration from the use raises the alloy melting point to above a desired level. Scrap metal such as in the discharged alloy is readily saleable.

In a preferred embodiment a screw conveyor is used to move the solid feed over the alloy surface from a beginning to an exit end of a molten bath unit. The unit is constructed to have off gases travel a tortuous path through the conveyor flights and to cause the solids to roll and mix as they move over the alloy surface thereby allowing sufficient surface contact to break volatile organics into their elemental parts and to effectively dissolve the heavy metals from the remaining solids.

In the preferred embodiment the alloy is held in molten state at about 800° to 850° C. by fossil fuel heating in a separate compartment with molten alloy being separated by a short ceramic baffle reaching below the surface in order to form sealed compartments above while allowing free alloy mixing to continually replace heat used in treatment.

The feed rate may be controlled using a star feeder. There is a controlled inert gas purge below the star feeder during operation. The movement of the solid over the alloy surface may be controlled by variation of the turning speed of the conveyor. The feed rate and conveyor speed may be varied to produce desired treatment of a particular type feed and to allow maintaining of alloy temperature.

Off gas from the pyrolysis unit is quenched and cooled in an inlet line to a cyclone separator by water sprays. In the cyclone separator the gas is scrubbed by the liquid and carbon settles to the cone shaped bottom of the separator. A star feeder valve may be used to draw off the carbon sludge for disposal. The water recycles through a pump and through a cooler to the spray nozzles in the off gas line.

DETAILED DESCRIPTION OF THE DRAWINGS

The invention may be best described from the drawings.

Figure 1:
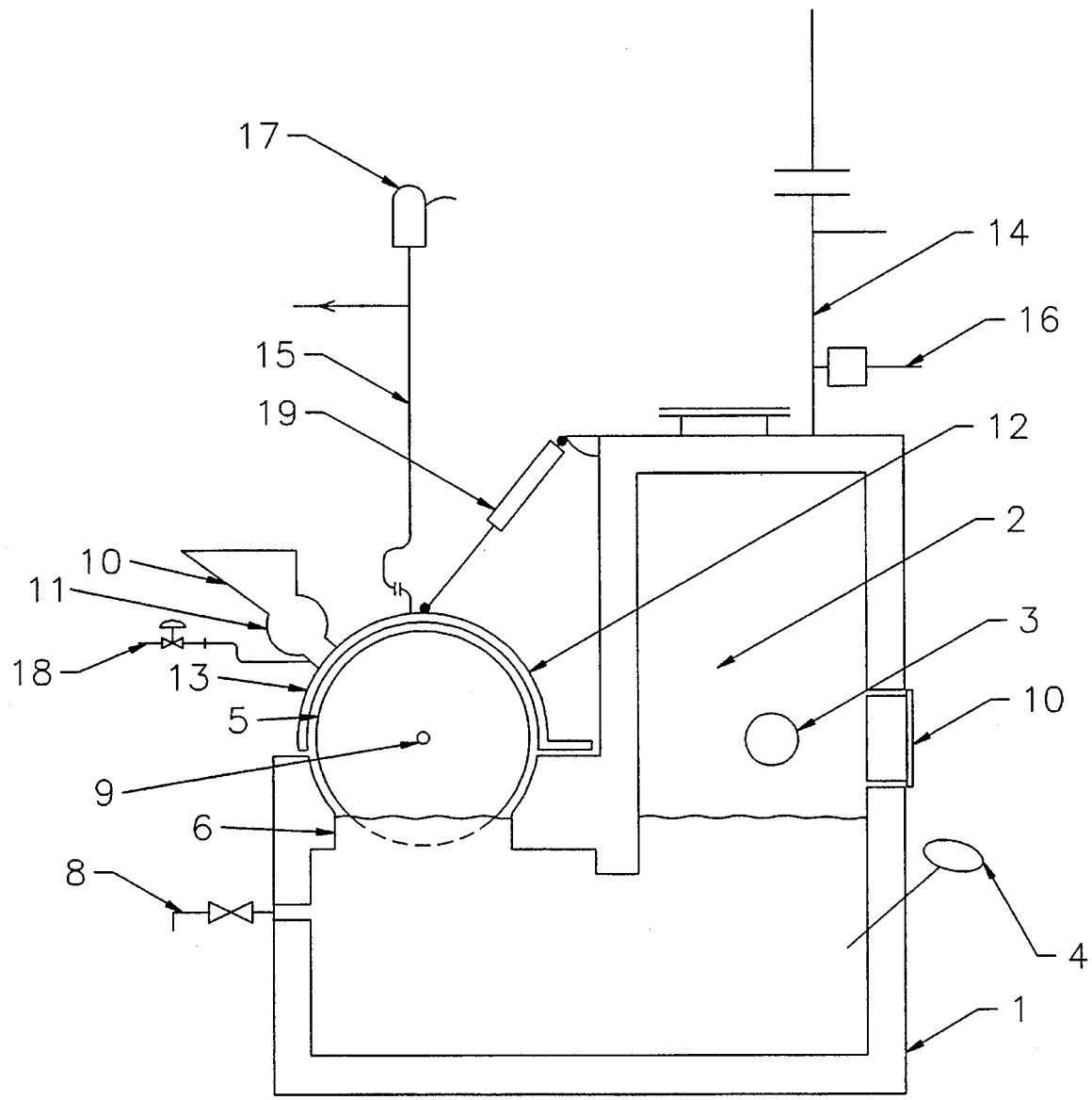
FIG. 1 shows a from view of a preferred embodiment of the unit wherein heat is supplied to the alloy by a fossil fuel heater.

In FIG. 1 we show a front cut-a-way view of a preferred embodiment of the brick lined pyrolysis unit 1. The preferred outer metal shell is a high melting stainless steel. The pyrolysis unit 1 may also be lined with a high temperature refractory material or fabricated from special metal alloy. In the pyrolysis unit 1 the first compartment or firebox compartment 2 is heated by the burner 3. Burner 3 heats alloy metal charged through port 23 to form a molten alloy held at level 6. Molten alloy underflow the baffle between the two compartments into the second compartment essentially formed by hinged shell 13.

The alloy composition may be varied as follows for particular type wastes:

50–100% Aluminum

0–20% Calcium

0–50% Zinc

0–50% Iron

0–50% Copper

Various metal impurities in commercial grade aluminum or aluminum scrap are acceptable. Hinged shell 13 may be lined with a ½ inch or more thick ceramic fiber blanket 5 to minimize heat loss and to improve internal gas contact as will be later described.

Figure 3:
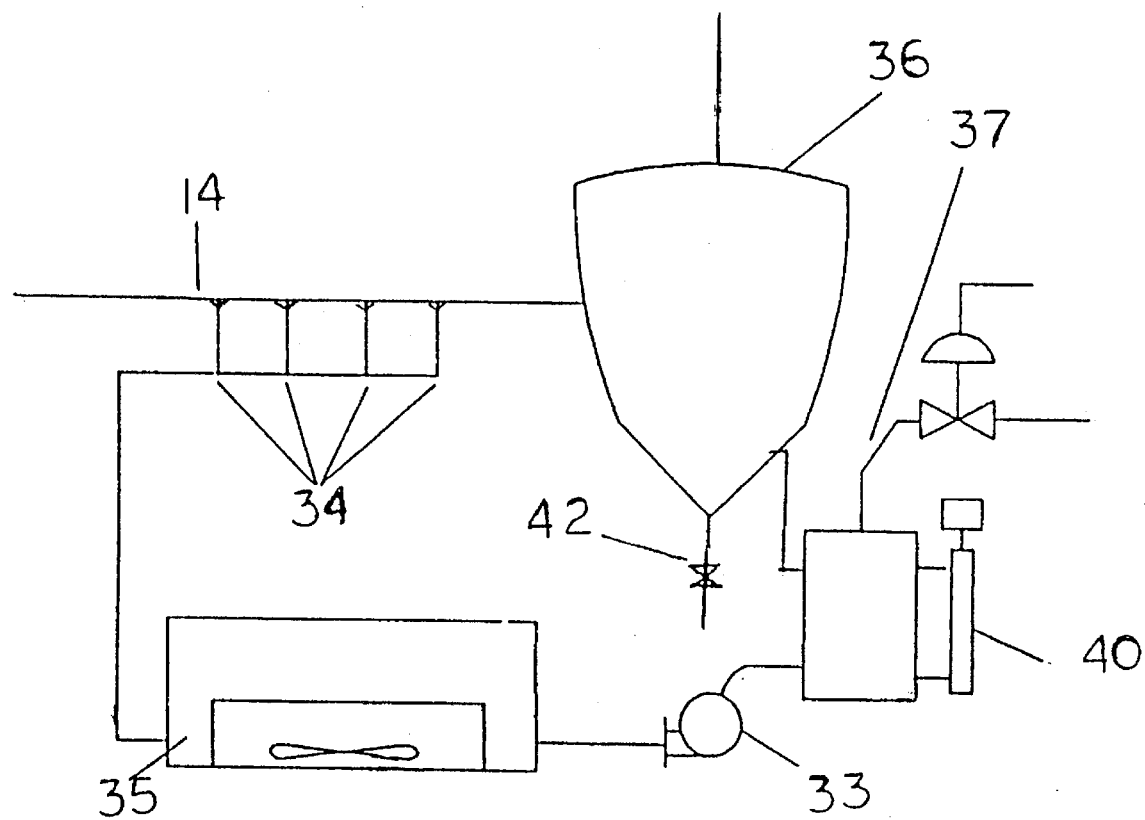
FIG. 3 shows the off gas scrubbing and carbon recovery.

Solid or semi-solid feed may be fed through charge chute 10 in a controlled manner through star feeder valve 11. A star feeder valve provides essentially a positive seal and rotation speed may be changed to control the feed rate. Automatic valve 18 is used to control a small but continuous inert gas flow through the vent. Preferred inert gas is carbon dioxide. Star feeder valve 11 discharges to drop feed at an inlet end of screw conveyor 9. Ceramic blanket 5 that forms a lining and baffle 21 are shaped to minimize clearance around screw conveyor 9. Heat shield 12 may be thin metal welded with about 1 inch clearance from shell 13 thereby remaining cool from air movement caused by the chimney effect. Off gas line 15 goes to a scrubber as shown in FIG. 3. Relief valve 17 is preferably a flapper type valve with the flapper essentially forming part of the pipe interior. Hydraulic lift 19 lifts the shell 13 for inspection or to allow skimming off of molten slag such as glass or, aluminum oxides. In heating chamber 2 a fossil fuel burner 3 heats the aluminum essentially by radiated heat from the flame and ceramic liner. The ratio of air to fuel may be automatically adjusted from oxygen analyzer—controller 16 to maintain a low level of oxygen in the off—gas line 14 preferably below 0.3 percent. Temperature sensor 4 may co-operate with known instrumentation to control fuel flow to burner 3 to maintain molten alloy 20 at about 850° C. and to reduce rotation speed of star feeder valve 11 when the burner 3 reaches maximum output. Port 23 is preferably hinged and allows charging of solid metals when necessary to maintain alloy level 6 and also allows skimming of slag if build up is excessive.

Figure 2:
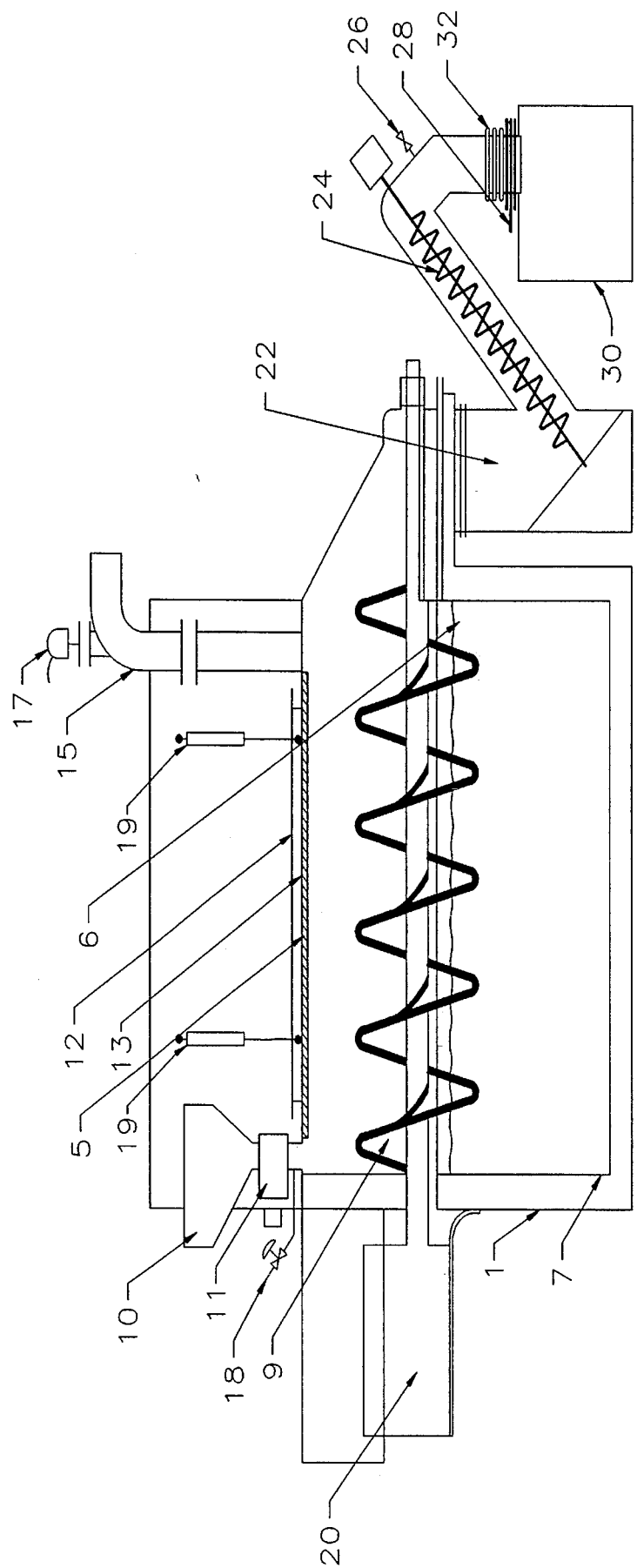
FIG. 2 is a cut - a - way side view indicating construction and location of major elements of the pyrolyzer section of the unit.

In FIG. 2 we've shown a cut-a-way side view to more clearly indicate function of screw conveyor 9 and indicate treated solids handling through catch bin 22, conveyor 24 and into discharge bin 30.

Solid or semi-solid feed from charging chute 10 are flow controlled by rotational speed of star feeder valve 22 or a similar unit and fall into the first flight of screw conveyor 9 that is driven by a variable speed motor 25. The liquid level 6 of the molten alloy is held below the shaft of screw conveyor 9. With screw conveyor as shown the decomposition products will mainly follow an elongated path through the conveyor flights. Solids will by moved, rolled, and mixed to have a good surface contact with molten alloy 20. Treated solids will fall into catch bin 22. A second screw conveyor, 24 is shown to convey solids through a flexible connection 32 to bin 30. Slide gate valve 28 is closed to exclude air from the system while changing discharge bin 30. A belt conveyor, bucket elevator etc. could be used instead of the second screw conveyor 24.

In FIG. 3 we've shown a simple off gas scrubber and carbon removal system to scrub off gas from the pyrolysis unit. Off gas line 14 leads to cyclone separator - scrubber unit 36. Water spray nozzles 34 cool the off gas below 100° C. thereby condensing out water. The action of the cyclone separator 36 separates carbon and, other particulate which will settle into the conical-shaped bottom. A sludge draw off may be controlled through valve 42 which may be a star feeder, or any of several other well known valves used for sludge service. Level controller 40 controls make up water through line 37 to maintain a level above the inlet line to circulating pump 33. Circulating pump 33 circulates through a cooler 35. Cooler 35 could be a water cooled exchanger or air cooled. Although not shown cooling towers are available in various sizes and also would work equally well. Pollution free off gas, including the purge gas used, escape to the atmosphere through line 38.

What is claimed is:

1. Equipment for surface treatment of hazardous solids and semi-solids with molten alloy comprising:
   a) An equipment means to move said solids across said molten alloy surface, to provide a path to contact off gases with said molten alloy, to discharge said solids after treatment and to scrub said off gas and to remove Carbon eluted in said off gas while purging said equipment means to essentially have an absence of air; said equipment means comprising;
   1) a dual compartment with high temperature refractory lined chamber;
   2) a burner in a first compartment of said chamber to heat a reactive alloy to maintain said alloy as molten liquid at about 850° C.;
   3) a baffle means between said first compartment and a second compartment in said dual compartment chamber, said baffle means allowing flow of said molten liquid between said first and said second chamber;
   4) a feed means to meter a solid flow and a transport means to transport solids in said solid flow across a surface of said molten liquid to a discharge opening in said second chamber.

2. Equipment for surface treatment of hazardous solids and semi-solids with molten alloy as in claim 1 wherein said second chamber is closed with hinged metal top with essentially a half cylinder shape.

3. Equipment for surface treatment of hazardous solids and semi-solids with molten alloy as in claim 1 wherein said transport means is a screw conveyor mounted in said hinged top and sized to fit closely in said hinged top.

4. Equipment for surface treatment of hazardous solids and semi-solids with molten alloy as in claim 1 wherein said discharge opening communicates in a gas tight manner with a discharge bin; said discharge bin being equipped with a conveyor means to continuously feed material to a waste container.

5. Equipment for surface treatment of hazardous solids and semi-solids with molten alloy as in claim 1 wherein said baffle means and said ceramic lining are shaped to fit closely around a lower side of said screw conveyor.

6. Equipment for surface treatment of hazardous solids and semi-solids with molten alloy as in claim 1 wherein said feed means to meter said solid flow co-operates with a temperature controller that controls fuel feed to said burner to control said solid flow to maintain said molten liquid at a temperature above about 800° C. when said fuel feed reaches a maximum.

7. Equipment for surface treatment of hazardous solids and semi-solids with molten alloy comprising:

a) a refractory lined chamber;

b) a reactive metal alloy in said refractory lined chamber;

c) a heating means to heat said reactive metal alloy in said refractory lined chamber to a minimum of about 800° C. to form a molten alloy mass;

d) a feeding chute means to feed said waste to a surface of said molten alloy mass;

e) a conveyor means in said refractory lined chamber to move said waste across a surface of said molten alloy mass; said conveyor means also acting to conduct off gas in a path across said surface of said alloy mass.

8. Equipment for surface treatment of hazardous solids and semi-solids slurries with molten alloy as in claim 7 wherein said conveyor means is a screw conveyor and a top of said refractory lined chamber fits closely over top one half of said screw conveyor thereby causing greater contact of off gas from said waste with said metal alloy surface.

9. A process for surface treatment of hazardous solids with molten alloy comprising:

a) heating a reactive alloy means in a first chamber of pyrolysis unit to a minimum of 800° C. to form a molten liquid;

b) feeding and transporting said solids across a surface of said molten liquid in a second chamber with transporting means designed so that pyrolysis products from pyrolysis of said solids are heated to a minimum of 250° centigrade and treated solids discharge to a waste container;

c) feeding off gas from said pyrolysis unit to a circulating aqueous scrubber;

d) maintaining continuous inert gas purge through said second chamber and said scrubber to essentially eliminate oxygen;

e) drawing off solids carried in said off gas from a bottom of said scrubber.

10. An alloy composition for surface treatment of hazardous solids and slurries comprising:

50–100% Commercial grade Aluminum

0–20% calcium

0–50% iron

0–50% zinc

0–50% copper.

11. An alloy composition for surface treatment of hazardous solids and slurries comprising:

50–100% scrap aluminum

0–20% calcium

0–50% iron

0–50% zinc

0–50% copper.

12. Equipment for surface treatment of hazardous solids and semi-solids with molten alloy comprising:

a) An equipment means to move said solids across said molten alloy surface, to provide a path to contact aff gases with said molten alloy, to discharge said solids after treatment and to scrub said off gas and to remove carbon eluted in said off gas while purging said equipment means to essentially have an absence of air; said equipment means comprising;

1) a dual compartment with high temperature refractory lined chambers;

2) a burner in a first compartment of said chamber to heat a reactive metal alloy to maintain said alloy as molten liquid at about 850 degrees centigrade;

3) a baffle means between said first compartment and a second compartment in said dual compartment chamber, said baffle means allowing flow of said molten liquid between said first and said second chamber;

4) a feed means to meter a solid flow and a transport means to transport solids in said solid flow across a surface of said molten liquid to a discharge opening in said second chamber; said transport means further comprising a screw conveyor fabricated from a ferrous metal and ceramic coated and mounted in a closely fitting insulated hinged metal top with an essentially half cylinder shape.

* * * * *